United States Patent [19]

Shimada et al.

[11] Patent Number: 5,187,704
[45] Date of Patent: Feb. 16, 1993

[54] MONITORING METHOD FOR STAND-BY CIRCUITS SUITABLE FOR A MULTIPLEXING/DEMULTIPLEXING APPARATUS

[75] Inventors: Naohiro Shimada, Tokyo; Yasushi Ohno; Masaaki Saito, both of Miyagi, all of Japan

[73] Assignee: NEC Corporation, Tokyo, Japan

[21] Appl. No.: 530,000

[22] Filed: May 29, 1990

[30] Foreign Application Priority Data

Mar. 31, 1988 [JP] Japan .................................. 63-80679
May 30, 1989 [JP] Japan .................................. 1-138672
Jul. 11, 1989 [JP] Japan .................................. 1-179302

[51] Int. Cl.$^5$ .............................................. H04J 1/16
[52] U.S. Cl. ..................................... 370/13; 370/16; 370/84
[58] Field of Search ............... 370/14, 16, 13, 15, 370/112, 84; 375/10; 340/825.01, 827; 371/8, 11

[56] References Cited

U.S. PATENT DOCUMENTS

| | | | |
|---|---|---|---|
| 4,046,964 | 9/1977 | Daugherty et al. | 370/14 |
| 4,376,998 | 3/1983 | Abbott et al. | 310/13 |
| 4,567,587 | 1/1986 | McDermott | 370/13 |
| 4,712,209 | 12/1987 | Kuritami et al. | 370/13 |

*Primary Examiner*—Curtis Kuntz
*Assistant Examiner*—Temesghen Ghebretinsae
*Attorney, Agent, or Firm*—Sughrue, Mion, Zinn, Macpeak & Seas

[57] ABSTRACT

In a multiplexing/demultiplexing apparatus, readiness of stand-by circuits is monitored through a variety of switching arrangements, by routing a monitoring signal through the circuits. In one alternative embodiment, level correcting means are provided so that the monitoring signal is kept at the proper level, thus ensuring accurate monitoring of the stand-by circuits.

5 Claims, 10 Drawing Sheets

MONITORING METHOD FOR STAND-BY CIRCUITS SUITABLE FOR A MULTIPLEXING/DEMULTIPLEXING APPARATUS

BACKGROUND OF THE INVENTION

The present invention relates to a method of monitoring a circuit or an apparatus and, more particularly, to a method of monitoring stand-by circuits (apparatuses) which are installed in equipment having a redundant configuration.

Communication equipment or similar equipment which has to be extremely reliable is provided with a stand-by circuit which replaces an active circuit when the active circuit fails. Such equipment is also provided with a monitor for constantly monitoring the stand-by circuit, so that the stand-by circuit may function normally in the event that the active circuit is replaced. Typically, a dummy signal or a similar monitoring signal is fed to the stand-by circuit so as to determine whether the circuit is normally operable on the basis of the resultant output signal of the circuit. It has been customary to provide a monitor of the type using such a monitoring method with monitoring signal generating circuits and monitoring signal receiving circuits, each being associated with a particular stand-by circuit.

The conventional monitor as stated above has a problem left unsolved. Specifically, in the case of an apparatus for multiplexing communication channels, for example, the number of monitoring signal generating circuits and the number of receiving circuits needed are the same as the number of channels. This increases the overall dimensions, cost, and power consumption of the monitor.

SUMMARY OF THE INVENTION

It is therefore an object of the present invention to provide a method which promotes easy monitoring of stand-by circuits.

In the present invention, a method of monitoring a plurality of independent stand-by circuits included in a stand-by device which will be used when an active device fails, comprises the steps of generating a monitoring signal for monitoring the plurality of stand-by circuits, applying the monitoring signal to one of the plurality of stand-by circuits, performing a repetitive operation of feeding the monitoring signal routed through one stand-by circuit to another stand-by circuit to which the monitoring signal has not been applied, and determining whether or not the plurality of stand-by circuits are normally operable on the basis of the monitoring signal having been routed through all of the plurality of stand-by circuits.

BRIEF DESCRIPTION OF THE DRAWINGS

The above and other objects, features and advantages of the present invention will become more apparent from the following detailed description taken with the accompanying drawings in which.

DETAILED DESCRIPTION OF THE PREFERRED EMBODIMENTS

Figure 1:
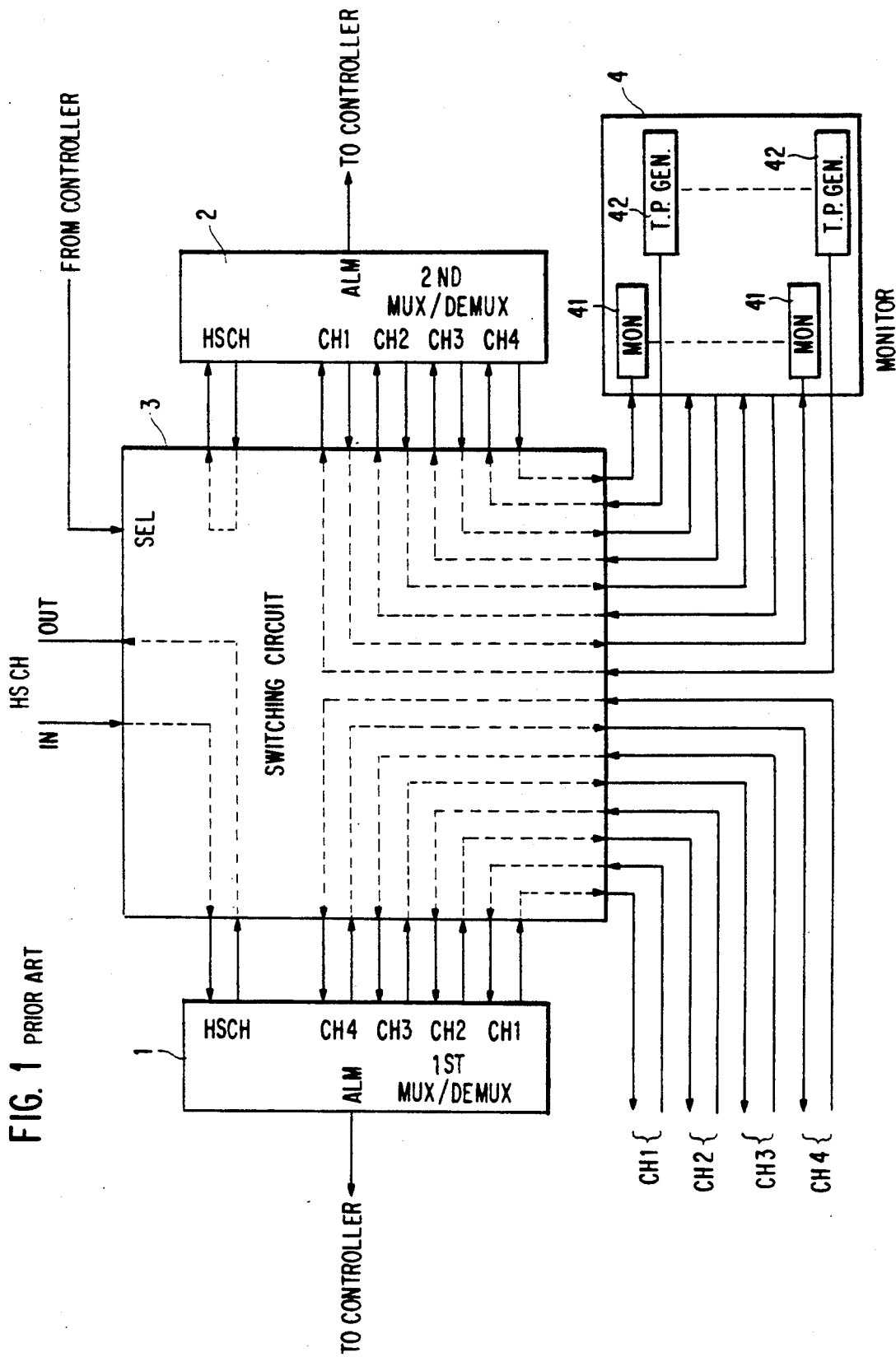
FIG. 1 is a block diagram schematically showing a time division multiplexing/demultiplexing system implemented by a prior art stand-by circuit monitoring method.

First, a prior art method of monitoring a stand-by circuit, as shown in FIG. 1 is discussed here. The prior art method refers to a time division multiplexing/demultiplexing apparatus having a one-to-one redundant construction, by way of example. Specifically, the apparatus has a first and a second multiplexer/demultiplexer (MUX/DEMUX) 1 and 2 each being constructed to multiplex a first to a fourth lower order bit sequence (lower sequence channel) into a single higher order bit sequence (higher sequence channel) and to demultiplex multiplexed channels. A controller, not shown, conditions one of the MUX/DEMUXs 1 and 2 as an active unit and the other as a stand-by unit.

A monitor 4 includes test pattern generating circuits 42, where each circuit 42 is being associated with a respective one of the circuits to be monitored which are installed in the stand-by MUX/DEMUX, i.e., stand-by circuits. The monitor 4 also includes monitor circuits 41, each of which detects an error of the associated stand-by circuit from a received signal. In this specific application, the method monitors four lower sequence channels and one higher sequence channel (HSCH), so that the monitor 4 has four test pattern generating circuits 42 and four monitor circuits 41. A switching circuit 3 couples the inputs of the four channels of lower sequence, the input and output of a test pattern for monitoring, and the input and output of the higher sequence channel to corresponding input and output terminals of the MUX/DEMUXs 1 and 2. Further, the switching circuit 3 short-circuits the higher sequence channel input and the output of the stand-by MUX/DEMUX.

Assuming that the first MUX/DEMUX 1 is an active unit and the second MUX/DEMUX 2 is a stand-by unit, the switching circuit 3 connects corresponding input and output terminals as indicated by phantom lines in FIG. 1. Specifically, the inputs and outputs of the monitor 4 are interconnected to the lower sequence channel inputs and outputs of the MUX/DEMUX 2, while the data on the first to fourth lower sequence channels are applied to the lower sequence inputs and outputs of the first MUX/DEMUX 1. The data on the HSCH are applied to the HSCH input and output of the MUX/DEMUX 1 while the HSCH input and output of the second MUX/DEMUX 2 are short-circuited.

The stand-by circuits are monitored as follows. The test pattern generating circuit 42 associated with the first lower sequence channel CH1 generates test pattern data having the same rate as the data of the channel CH1, e.g., a periodic pattern symbol sequence. The test pattern data, or simply a test pattern, is fed to the channel CH1 input of the second MUX/DEMUX 2. The second MUX/DEMUX 2 multiplexes the input test pattern with the data on the second to fourth lower sequence channels CH2 to CH4 and feeds the resulting data to the switching circuit 3 via the higher sequence output thereof. Since the higher sequence input and output of the MUX/DEMUX 2 are short-circuited in the switching circuit 3 as stated earlier, the multiplexed test patterns are simply returned to the higher sequence input of the MUX/DEMUX 2. In response, the MUX/DEMUX 2 demultiplexes the multiplexed data into individual data and sends them out via the associated lower sequence channels CH1 to CH4. Hence, the test pattern applied to the channel CH1 input of the MUX/DEMUX 2 is returned to the monitor 4 via the channel CH1 output. The monitor circuit 41, therefore, is capable of monitoring the circuit associated with the channel CH1 of the MUX/DEMUX 2 by checking the result of reception. This is also true for the other test pattern generating circuits 42 and monitor circuits 41 which are associated with channels CH2 to CH4. This method allows the monitor 4 to monitor all of the stand-by circuits which are built in the MUX/DEMUX 2. Meanwhile, the first MUX/DEMUX 1 multiplexes and demultiplexes data coming in over external lines. In the circuitry of FIG. 1 which represents the prior art monitoring method, the test pattern applied to the channel CH1 of the MUX/DEMUX 2 will be preserved if the stand-by circuit associated with the channel CH1 is functioning normally. The present invention proposes a monitoring method for stand-by circuits which allows the individual channels to share a single test pattern.

Figure 2:
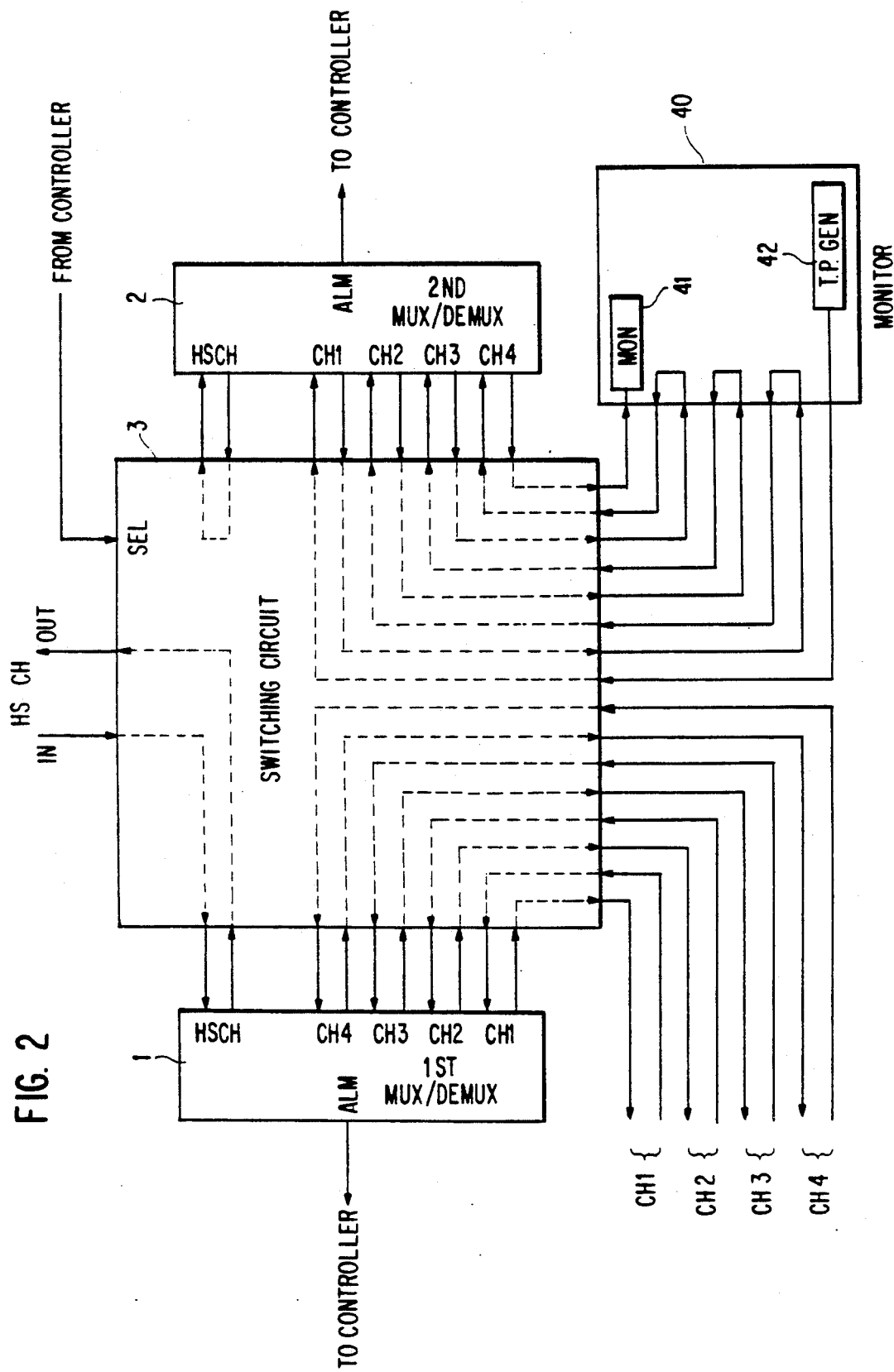
FIG. 2 is a block diagram schematically showing a first embodiment of the present invention.

As shown in FIG. 2, a first embodiment of the present invention includes a monitor 40 that distinguishes the illustrated embodiment from the prior art of FIG. 1. Specifically, the monitor 40 has only one test pattern generating circuit 42 associated with the channel CH1 of FIG. 1, and only one monitor circuit 41 associated with the channel CH4. A test pattern generated by the test pattern generating circuit 42 is multiplexed and demultiplexed by the second MUX/DEMUX 2 and then returned to the monitor 40 in the same manner as described earlier for FIG. 1. The monitor 40 returns the received test pattern to be used as a test pattern for the channel CH2. As the monitor 40 returns the test pattern to be used by the other channels CH3 and CH4 the monitor circuit 41 monitors the test pattern last received from the channel CH4. This configuration implements the monitor 40 in a far smaller circuit and at far lower cost than the configuration described in prior art.

Figure 3:
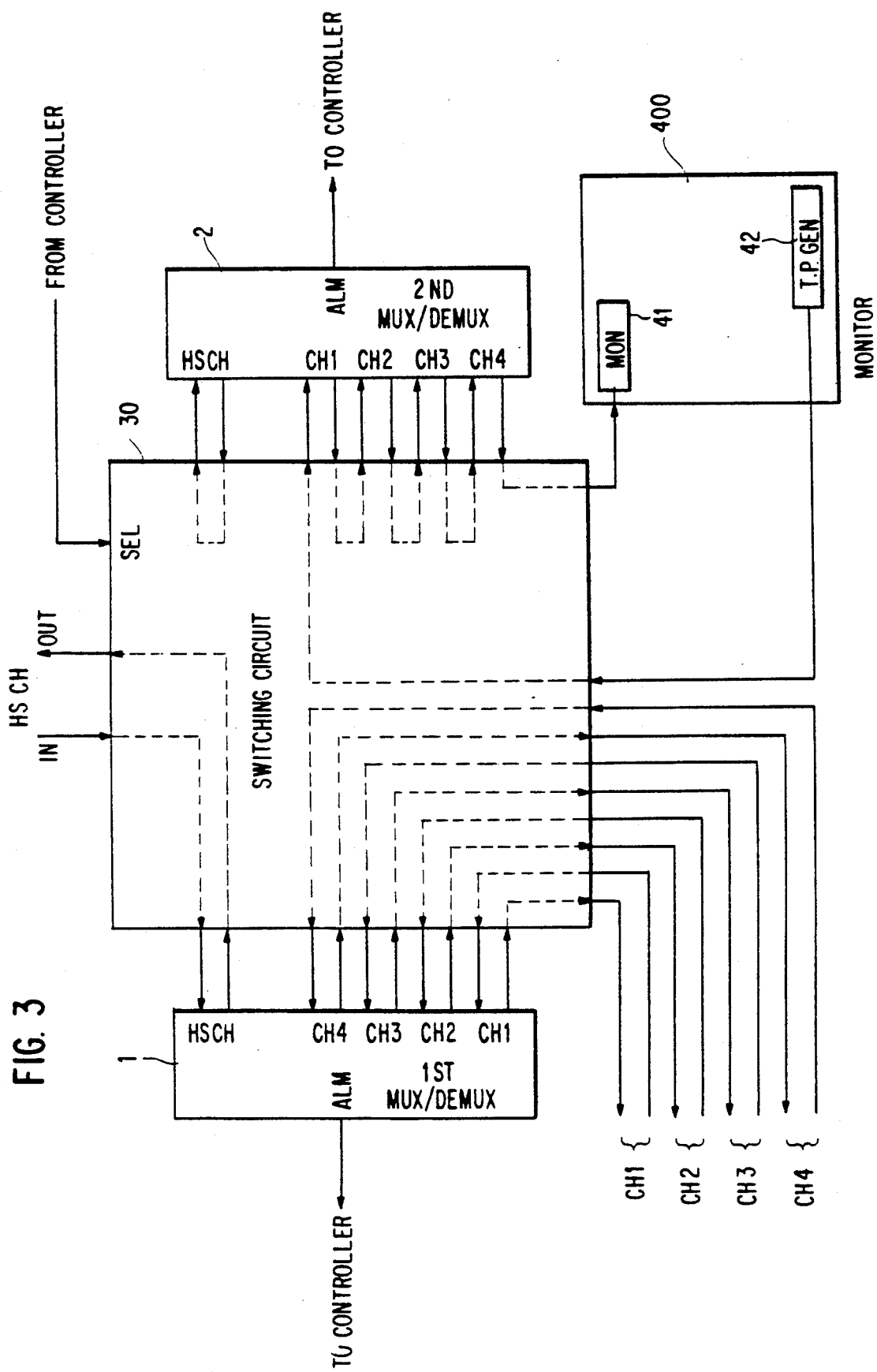
FIG. 3 is a block diagram schematically showing a second alternative embodiment of the present invention.

FIG. 3 is a block diagram representative of a second embodiment of the present invention. In this particular embodiment, the test pattern is returned not by a monitor 400 but by a switching circuit 30. While the monitor 400 monitors the test pattern in the same manner as the monitor 40 of FIG. 2, causing the switching circuit 30 to return the test pattern reduces the number of terminals for both the switching circuit 30 and monitor 400 and eliminate the need for wirings between the switching circuit 30 and the monitor 400.

Figure 4:
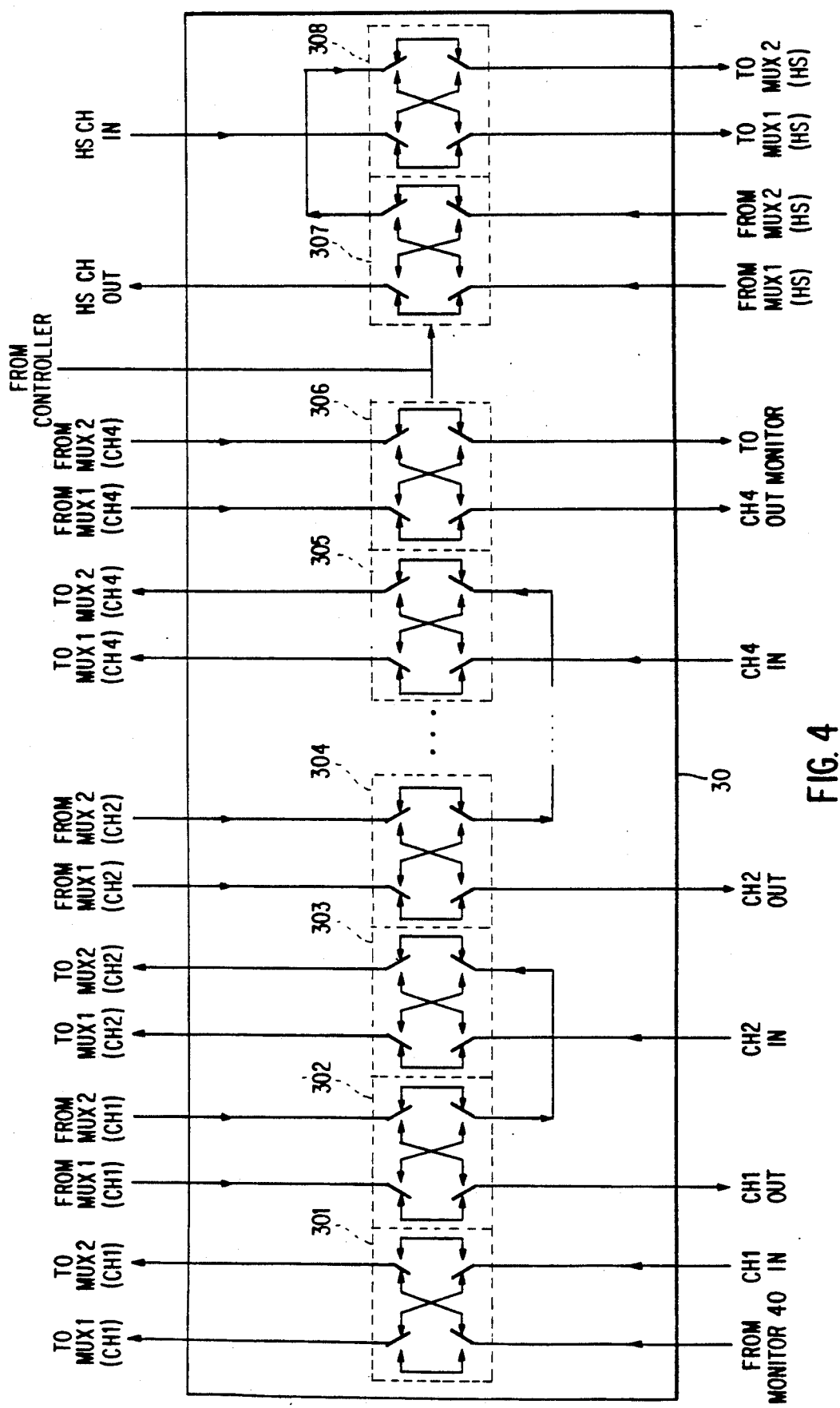
FIG. 4 is a diagram showing a specific construction of a switching circuit included in the embodiment of FIG. 3.

A specific construction of the switching circuit 30 is shown in FIG. 4, where the switching circuit 30 is made up of switches 301 through 308, each having two inputs and two outputs. In the figure, two switches associated with the channel CH3 are not shown. Assigned to channel CH1, the first switch 301 receives data over the channel CH1 and the test pattern from the monitor 400 and, under the control of a controller, not shown, feeds one of them to the first MUX/DEMUX 1 and the other to the second MUX/DEMUX 2. Since the first MUX/DEMUX 1 is assumed to be the active circuit, the switch 301 is conditioned as shown in the figure. The second switch 302 receives data from the channel CH1 demultiplexed by the MUX/DEMUXs, delivers data from the active MUX/DEMUX 1 as channel CH1 output data, and returns data (i.e., the test pattern) from the stand-by MUX/DEMUX 2, to one input of the third switch 303. The third and fourth switches 303 and 304 function in the same manner as the first and second switches 301 and 302, respectively. In such a configuration, data of the channel CH4 appears on one output of the sixth switch 306, while the test pattern routed through all the stand-by circuits to be monitored appears on the other output of the switch 306. The test pattern from the switch 306 is fed to the monitor 400. The seventh and eighth switches 307 and 308 are assigned to the higher sequence channel. Specifically, the seventh switch 307 receives the multiplexed outputs of the MUX/DEMUXs 1 and 2, sends out the multiplexed output of the MUX/DEMUX 1 as higher sequence channel data, and returns the multiplexed output of the MUX/DEMUX 2, i.e., the multiplexed test pattern, to one input of the eighth switch 308. The eighth switch 308 receives higher sequence channel data externally at its other input, and feeds the higher sequence channel data to the MUX/DEMUX 1 and the multiplexed test pattern returned from the seventh switch 307 to the MUX/DEMUX 2. While a controller, not shown, delivers a control signal to all the switches 301 to 308, only a part of such an arrangement necessary for the understanding of the illustrative embodiment is illustrated for simplicity. When the second MUX/DEMUX 2 is an active unit, the connection of all the switches 301 to 308 shown in FIG. 4 will be reversed.

Figure 5:
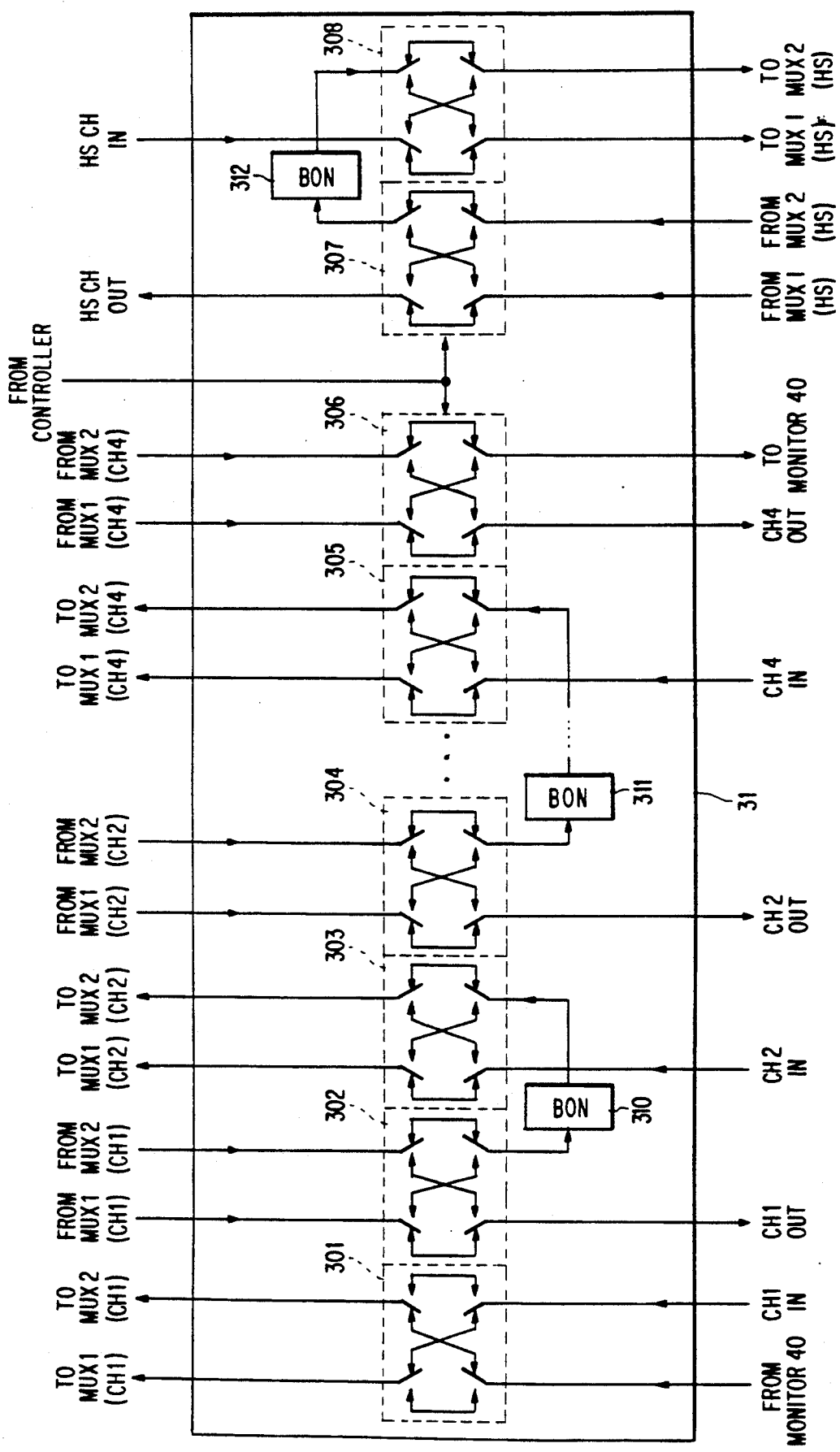
FIG. 5 is a diagram showing another specific construction of the switching circuit shown in FIG. 3.

In the apparatus shown in FIG. 3, the MUX/DEMUXs 1 and 2 each may have a highly sensitive receiving circuit for receiving a signal that has been attenuated or otherwise effected on a transmission path, or a transmitting circuit with its output signal corrected beforehand in order to compensate for the expected weakening and level decrease of a waveform ascribable to a transmission path. In such a case, the switching circuit may be constructed as shown in FIG. 5. Specifically, when the MUX/DEMUXs 1 and 2 are of the above-mentioned type, returning the monitoring signal directly to the lower sequence circuits is apt to disturb the operation of receiving sections included in the lower sequence circuits. In light of this, the circuitry shown in FIG. 5 comprises level correcting circuits in the form of BONs (Building Out Networks) 310 to 312 on the paths along which the monitoring signal is returned, thereby promoting accurate circuit monitoring. As is well known, the BON includes resistors, capacitors and coils. The rest of the construction and operation of the circuitry in FIG. 5 is essentially the same as the circuitry of FIG. 4.

Figure 6:
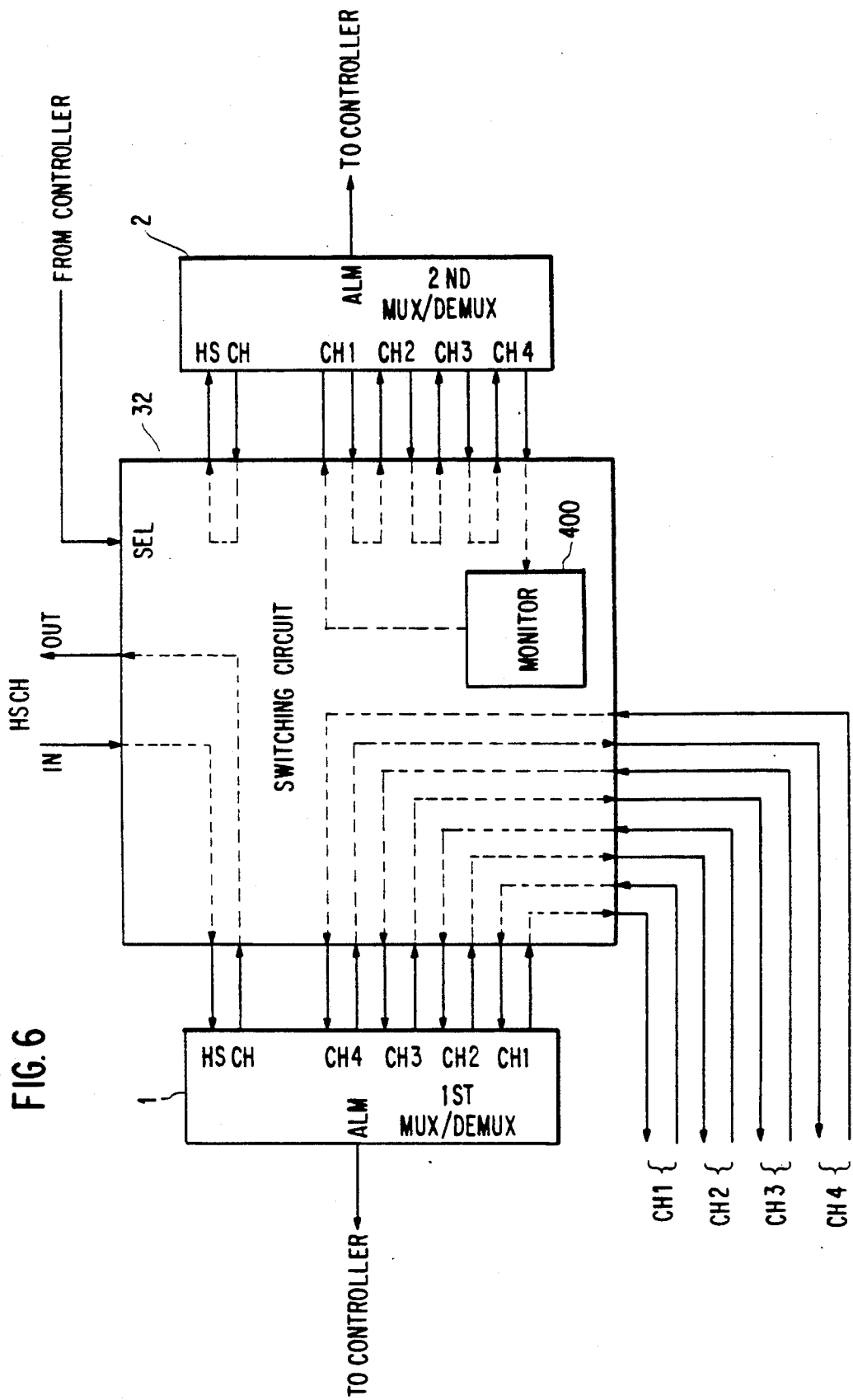
FIG. 6 is a block diagram showing a third embodiment of the present invention.

As shown in FIG. 6, the third embodiment of the present invention is similar to the embodiment of FIG.

Figure 7:
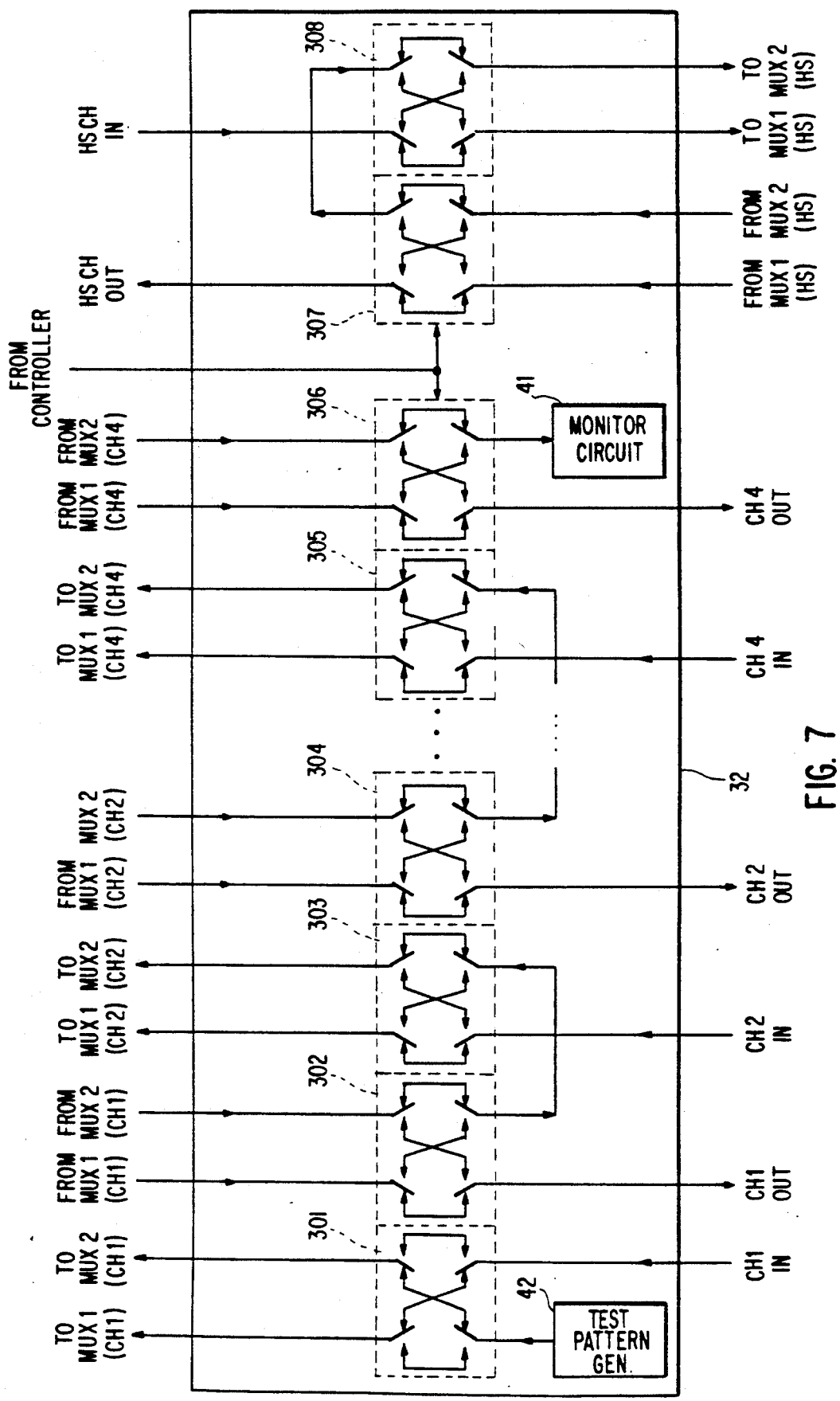
FIG. 7 is a diagram representative of a switching circuit included in the embodiment of FIG. 6.

3 except that the monitor 400 is built in the switching circuit 32. A specific construction of the switching circuit 32 with the built-in monitor 400 is shown in FIG. 7. In FIG. 7, the test pattern generating circuit 42 and the monitor circuit 41 are directly interconnected to one input of the first switch 301 and one output of the sixth switch 306, respectively. The built-in monitor 400 operates in the same manner as described in the embodiment of FIG. 3. The third embodiment of the invention is advantageous in that the signal lines and connecting terminals are not necessary between the switching circuit 30 and the monitor 400 unlike FIG. 3, and in that the monitor 400 does not need an exclusive space for installation.

Figure 8:
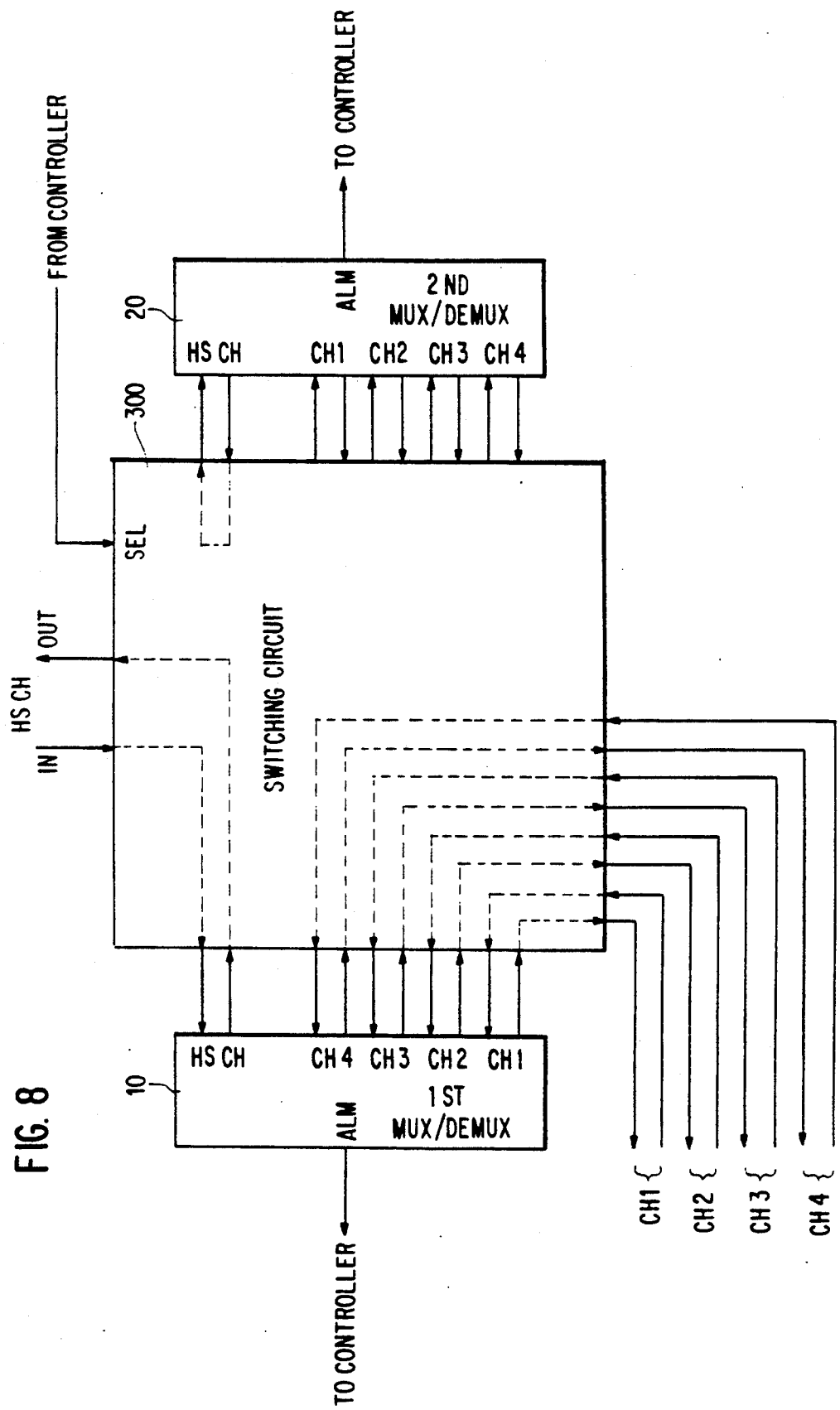
FIG. 8 is a block diagram showing a fourth embodiment of the present invention.
Figure 9:
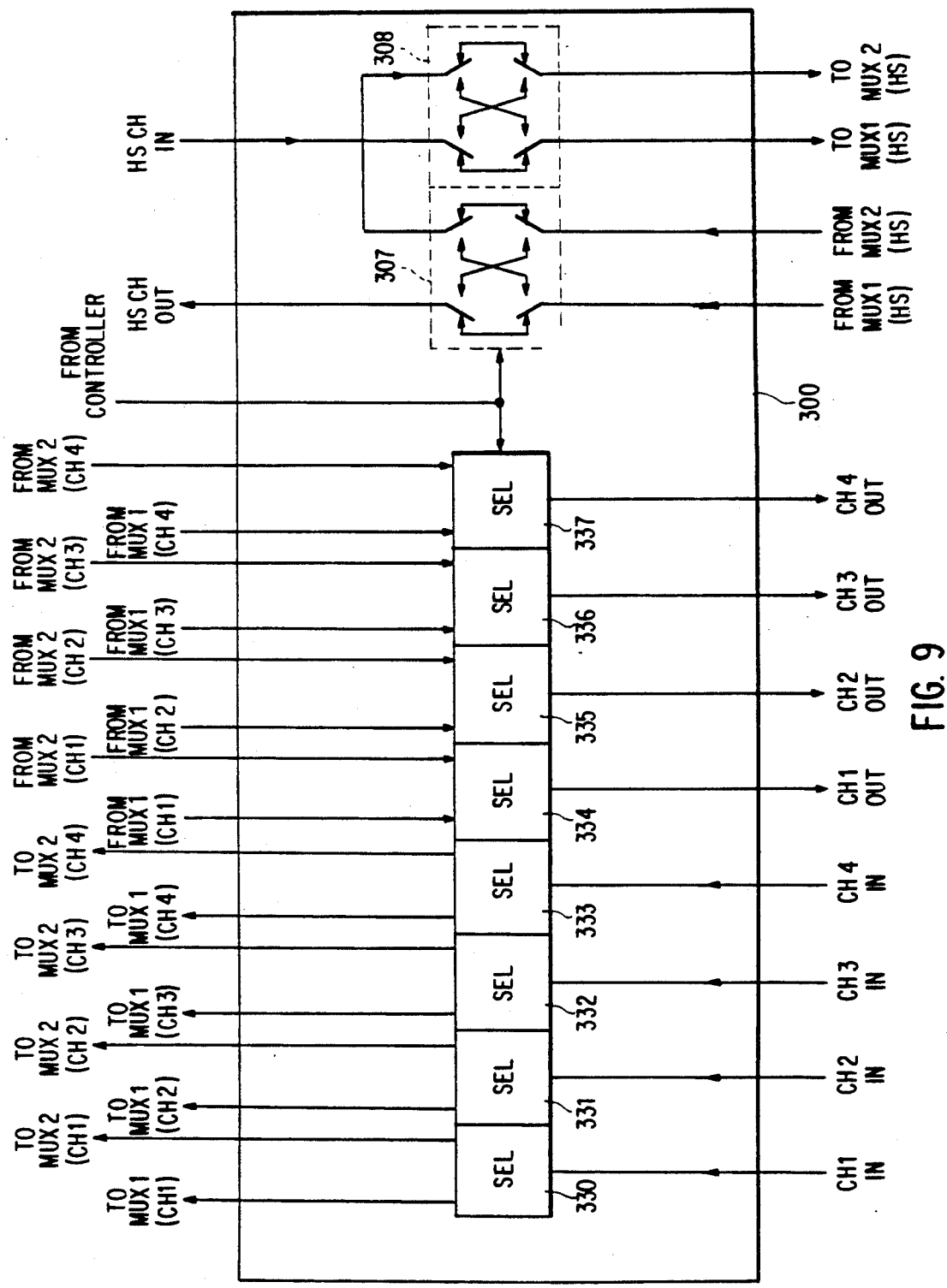
FIG. 9 is a diagram showing a specific construction of a switching circuit included in the embodiment of FIG. 8.

As shown in FIG. 8, a fourth embodiment of the present invention, the monitor 400 of FIG. 6 is built in each of a first and a second MUX/DEMUX 10 and 20 which are to be monitored, i.e., the test pattern is repetitively returned within the MUX/DEMUX 10 or 20. FIG. 9 depicts a specific construction of a switching circuit 300 for this embodiment. Since the test pattern is returned within the MUX/DEMUX 10 or 20, the switching circuit 300 is simpler in construction than the switching circuits of any of the first to third embodiments. As shown in FIG. 9, the inputs and outputs of the lower sequence channels may be implemented by selectors having one input and two outputs and selectors having two inputs and one output. First to fourth selectors 330 to 333 deliver respectively the data of the lower sequence channels CH1 to CH4 to the first MUX/DEMUX 10 or the second MUX/DEMUX 20. On the other hand, fifth to eighth selectors 334 to 337 receive multiplexed demultiplexed signals from the first and second MUX/DEMUXs 1 and 2 and send out one of the signals as the data of the lower sequence channels CH1 to CH4, respectively. Since the first MUX/DEMUX 10 is assumed to be active, all the selectors 330 to 337 select the first MUX/DEMUX 10. In the switching circuit 300, the operation associated with the higher sequence channel remains the same as before and, therefore, the switch construction for the higher sequence channel is not changed. A controller, not shown, feeds a control signal to all the selectors 330 to 337 and switches 307 and 308, although not shown in the figure.

Figure 10:
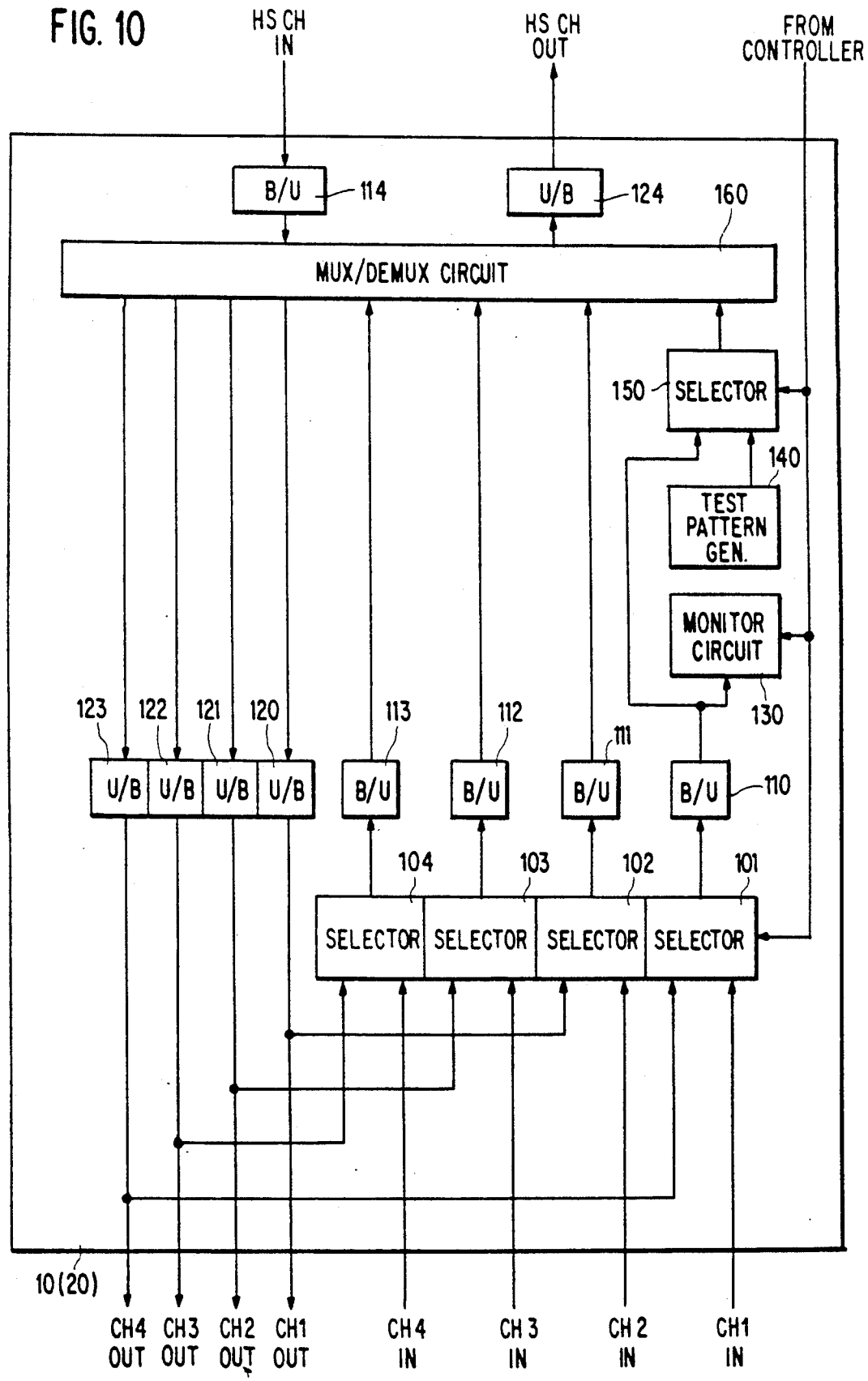
FIG. 10 is a block diagram showing a specific construction of a multiplexing/demultiplexing apparatus included in the embodiment of FIG. 8.

Referring to FIG. 10, a specific construction of the MUX/DEMUX 10 for practicing the embodiment of FIG. 8 is shown. Since the MUX/DEMUX 20 has the same structure as the MUX/DEMUX 10, only the MUX/DEMUX 10 is described hereinafter. As shown, the MUX/DEMUX 10 has first to fourth selectors 101 to 104, first to fifth bipolar-to-unipolar (B/U) converting circuits 110 to 114, first to fifth unipolar-to-bipolar (U/B) converting circuits 120 to 124, a MUX/DEMUX circuit 160, a test pattern generating circuit 140, a monitor circuit 130, and a fifth selector 150. The B/U converting circuits 110 to 114 and the U/B converting circuits 120 to 124 allow the use of a signal having a bipolar format on a transmission path and a unipolar format within the MUX/DEMUX 10.

The selectors 101 to 104 are associated with the lower sequence channels CH1 to CH4, respectively. Each of the selectors 101 to 104 receives lower sequence channel data at one input thereof and a test pattern returned at the other input thereof. The selectors select and output either the lower sequence channel data or the test pattern. The B/U converting circuits 110 to 113 are also associated with the lower sequence channels CH1 to CH4, respectively, for transforming the format of the outputs of the selectors 101 to 104 from bipolar to unipolar. The test pattern generating circuit 140 is the same as the test pattern generating circuit 42 mentioned in any of the previous embodiments. The selector 150 selectively outputs either the test pattern or the output of the B/U converting circuit 110. The MUX/DEMUX circuit 160 multiplexes the output signals of the selector 150 and the B/U converting circuits 111 to 113 and supplies a multiplexed signal to the fifth U/B converting circuit 124. The fifth U/B converting circuit 124 converts the multiplexed signal into bipolar form and outputs the converted signal as a higher bit rate sequence data. The fifth B/U converting circuit 114 converts the higher bit rate sequence data from the switching circuit 300 into a unipolar form and supplies the data sequence to the MUX/DEMUX circuit 160. The MUX/DEMUX circuit 160 demultiplexes the data sequence from the B/U converting circuit 114 and feeds the resulted signals to the U/B converting circuits 120 to 123. The monitor circuit 130 receives the output of the B/U converting circuit 110 for detecting an error in the stand-by circuits. Assuming that the MUX/DEMUX shown in FIG. 10 is in a stand-by state, then a controller, not shown, feeds control signals to the stand-by MUX/DEMUX such that the selector 101 selects the output of the U/B converting circuit 123, the selectors 102 to 104 select the outputs of the U/B converting circuits 120 to 122, respectively, and the selector 150 selects the output of the test pattern generating circuit 140. The monitor circuit 130 has an enable terminal to which a control signal from the controller is applied to enable it. The test pattern from the test pattern generating circuit 140 is fed to the MUX/DEMUX circuit 160 via the selector 150. The MUX/DEMUX circuit 160 multiplexes the test pattern from the selector 150 with the data of the first lower sequence channel CH1 and delivers the multiplexed data to the U/B converting circuit 124. The U/B converting circuit 124 converts the signal form of the multiplexed data and outputs the converted signal as higher sequence channel data. This multiplexed signal is returned from the switching circuit 300 to be applied to the MUX/DEMUX circuit 160 as higher sequence data after the B/U conversion at the B/U converting circuit 114. In response, the MUX/DEMUX circuit 160 demultiplexes the received signal and feeds the individual signals to the U/B converting circuits 120 to 123 which are associated with the lower sequence channels CH1 to CH4, respectively. At this time, the test pattern meant for the channel CH1 is applied to the U/B converting circuit 120. The U/B converted test pattern is fed out as channel CH1 data and, at the same time, is applied to one input of the selector 102. Since the selector 102 is conditioned to select the output of the U/B converting circuit 120, the test pattern routed through the channel CH1 is subjected to B/U conversion at the B/U converting circuit 111 and then directly applied to the channel CH2. Thereafter, the test pattern is processed in the same manner as the test pattern applied to the channel CH1, then routed through the U/B converting circuit 121 and selector 103 to the channel CH3, and then applied to the channel CH4 in the same manner. The output of the U/B converting circuit 123 is fed as channel CH4 data to the switching circuit 300 and selector 101. In this instance, the output of the second MUX/DEMUX 20 does not affect the operation of the system because the switching circuit 300 does not select it. The selector 101, like the other selectors 102 to 104, is conditioned to select the output of the U/B converting circuit 123 associated therewith, so that the test pattern is routed through the B/U converting circuit 110 to the monitor circuit 130. The monitor circuit 130 determines whether or not an error has occurred in the stand-by circuits by checking the received test pattern. When the MUX/DEMUX shown in FIG. 10 is in an active state, the selectors 101 to 104 will select the data of the lower sequence channels CH1 to CH4, the selector 150 will select the output of the B/U converting circuit 110, and the monitor circuit 130 will be disabled. This embodiment which has the test pattern generating circuit 140 and monitor circuit 130 built in the MUX/DEMUX 10 is advantageous because the switching circuit 300 is simplified in construction, and no switches are necessary for returning the test pattern. A second advantage attainable with this embodiment is that since the test pattern is fed and received without the intermediary of transmission paths, it is not necessary to provide either a U/B converting circuit at the output side of the test pattern generating circuit 140 or a B/U converting circuit at the input side of the monitor circuit 130.

In summary, it will be seen that the present invention provides a stand-by circuit monitoring method that monitors a stand-by circuit by comparing an input and an output state of a test pattern or similar monitoring signal, and needs only a single monitoring signal generating circuit and a single monitoring signal receiving circuit irrespective of the number of the stand-by circuits. This reduces the required space, cost, and power consumption. Advantages are derived from a unique construction wherein an output signal of a certain stand-by circuit is used as a monitoring signal for another stand-by circuit, and such a procedure is repeated until the monitoring signal has been returned to the monitor circuit by way of all the stand-by circuits.

Various modifications will become possible for those skilled in the art after receiving the teachings of the present disclosure without departing from the scope thereof. For example, while the switches in the switching circuit of the illustrative embodiments are implemented with relays, the relays may be replaced with switches using transistors or switching means using memories. The present invention is applicable not only to a multiplexing/demultiplexing apparatus but also to any other apparatuses so long as they preserve the state of a test pattern when stand-by circuits are free from errors.

What is claimed is:

1. A multiplexing/demultiplexing system for monitoring a stand-by device so that the stand-by device may function when an active device fails, comprising:
   first and second multiplexer/demultiplexer means for multiplexing m (m>1, where m is a natural number) lower bit rate sequence channels into n (n<m, where n is a natural number) higher bit rate sequence channels and demultiplexing said n higher bit rate sequence channels into said m lower bit rate sequence channels;
   monitor means comprising monitoring signal generating means for generating a monitoring signal to monitor a plurality of circuits included in said first and second multiplexer/demultiplexer means, and further comprising error detecting means for determining whether an error has occurred in said circuits by examining the monitoring signal; and
   switching circuit means responsive to a selection an external signal for selecting one of said first and second multiplexer/demultiplexer means as said active device and the other of said first and second multiplexer/demultiplexer means as said stand-by device and for routing said monitoring signal from said monitor means through said plurality of circuits, and further for interconnecting said m lower bit rate sequence channels and said n high bit rate sequence channels to said active device;
   said monitor means further comprising:
   means for feeding the monitoring signal to said switching circuit means through a first channel of the m lower bit rate sequence channels of said stand-by device;
   means for returning the monitoring signal received from said switching means after being fed to the first channel, and for further feeding said monitoring signal to said switching circuit means through a second channel of the m lower bit rate sequence channels of said stand-by device and subsequently receiving and returning the monitoring signal after being fed to said switching circuit means through x (where x=2, 3, ..., m−1) channels of the m lower bit rate sequence channels; and
   means for causing said error detecting circuit means to receive said monitoring signal from an m-th lower bit rate sequence channel of said stand-by device.

2. A multiplexing/demultiplexing system for monitoring a stand-by device so that the stand-by device may function when an active device fails, comprising:
   first and second multiplexer/demultiplexer means for multiplexing m (m>1, where m is a natural number) lower bit rate sequence channels into n (n>m, where n is a natural number) higher bit rate sequence channels and demultiplexing said n higher bit rate sequence channels into said m lower bit rate sequence channels;
   monitor means comprising monitoring signal generating means for generating a monitoring signal to monitor a plurality of circuits included in said first and second multiplexer/demultiplexer means, and further comprising error detecting means for determining whether or not an error has occurred in said circuits by receiving said monitoring signal; and
   switching circuit means responsive to an external selection signal for selecting one of said first and second multiplexer/demultiplexer means as said active device and the other of said first and second multiplexer/demultiplexer means as said stand-by device and for routing said monitoring signal from said monitor means through said plurality of circuits;
   said switching circuit means further comprising:
   first switch means for interconnecting said m lower bit rate sequence channels and said n higher bit rate sequence channels to said active device;
   second switch means for interconnecting said monitoring signal from said monitor means to a first lower bit rate sequence channel input of the stand-by device;
   said second switch means comprising:
   means for receiving the monitoring signal at a first lower bit rate sequence channel output and returning said first lower bit rate channel output to a second lower bit rate sequence channel input of the stand-by device, and subsequently receiving the monitoring signal at an x-th (x=2, 3, ..., m-1) lower bit rate sequence channel input of said stand-by device and returning said monitoring signal to said monitor means through a (x+1) lower bit rate sequence channel output; and means for feeding said (x+1) lower bit rate sequence channel output to said error detecting circuit means; and third switch means for short-circuiting a higher bit rate sequence channel input of said stand-by device to a higher bit rate sequence channel output of said stand-by device.

3. A multiplexing/demultiplexing system as claimed in claim 1, wherein said second switch means includes level correcting means, disposed on paths along which said monitoring signal is returned from said second switch means to said stand-by device, for correcting a level of said monitoring signal so as to ensure accurate circuit monitoring.

4. A multiplexing/demultiplexing system as claimed in claim 2, wherein said monitor means is physically located within said switching circuit means such that the monitoring signal generating means is directly connected to said second switch means.

5. A multiplexing/demultiplexing system for monitoring a stand-by device so that said device may function when an active device fails, comprising:

first and second multiplexer/demultiplexer means for multiplexing m (m>1, where m is a natural number) lower bit rate sequence channels into n (n<m, where n is a natural number) higher bit rate sequence channels; and switching circuit means responsive to an external selection signal for selecting one of said first and second multiplexer/demultiplexer means as said active device and the other of said first and second multiplexer/demultiplexer means as said stand-by device and for routing said monitoring signal through said stand-by circuits; said switching circuit further comprising: first switch means for interconnecting said m lower bit rate sequence channels and said n higher bit rate sequence channels to one of said first and second multiplexer/demultiplexer means, and second switch means for short-circuiting a higher bit rate sequence channel input of said stand-by device to a higher bit rate sequence channel output of said stand-by device;

said first and second multiplexer/demultiplexer means further comprising:

monitoring signal generating means for generating a monitoring signal for monitoring a plurality of circuits included in said first and second multiplexer/demultiplexer means;

first selector means for receiving a first lower bit rate sequence channel input from said m lower bit rate sequence channels as a first input signal and further receiving an m-th lower bit rate sequence channel output as a second input signal, and outputting one of said first and second input signals as a first selected output signal in response to said selection signal;

second through m-th selector means each of which receives one of the second through m-th lower bit rate sequence channels of the m lower bit rate sequence channels, as a first selector input signal receives one of the first through (m−1)-th lower bit rate sequence channel outputs as a second selector input signal, and outputs one of said first and second selector input signals as second through (m−1)-th selected output signals in response to the selection signal, respectively;

error detecting circuit means responsive to said selection signal for receiving said first selected output signal and for determining whether or not any of the circuits of said first and second multiplexer/demultiplexer means have failed;

(m+1)-th selector means for receiving said first selected output signal as a first selector signal and the monitoring signal as a second selector signal, and outputting one of said first and second input signals as a (m+1)-th selected output signal; and multiplexing and demultiplexing circuit means for multiplexing and outputting said (m+1)-th selected output signal and said second through m-th selected output signals to the n higher bit rate sequence channels, and for demultiplexing and outputting the received n higher bit rate sequence channels to the m lower bit rate sequence channels.

* * * * *